United States Patent [19]
Prost et al.

[11] 3,778,790
[45] Dec. 11, 1973

[54] INCREMENTAL RECORDATION ON TEST TUBE

[75] Inventors: Jean-Louis Prost, Geneva; Manuel C. Sanz, Grand-Lancy, both of Switzerland

[73] Assignee: Micromedic Systems, Inc., Philadelphia, Pa.

[22] Filed: Dec. 7, 1970

[21] Appl. No.: 95,644

[52] U.S. Cl.............. 340/174.1 A, 23/253, 40/21, 40/310, 179/100.2 A
[51] Int. Cl. .......................................... G11b 15/02
[58] Field of Search ............ 235/61.12 M; 40/310, 40/2.2, 21; 23/292, 253; 340/174.1 C, 174.1 G, 174.1 H, 174.1 K, 174.1 R; 346/74 M, 74 MP; 179/100.2 A

[56] References Cited
UNITED STATES PATENTS

| | | | |
|---|---|---|---|
| 3,130,392 | 4/1964 | Miller.................... | 340/174.1 B |
| 3,581,297 | 5/1971 | Behr..................... | 340/174.1 H |
| 3,619,568 | 11/1971 | Teplin.................... | 340/174.1 H |
| 3,620,678 | 11/1971 | Guigan.................... | 23/253 R |
| 3,476,515 | 11/1969 | Johnson et al............. | 23/292 |
| 3,540,858 | 11/1970 | Rochte et al.............. | 23/253 R |
| 3,504,376 | 3/1970 | Bednar et al............. | 23/292 |
| 3,589,867 | 6/1971 | Heinz et al............... | 23/253 R |
| 2,659,614 | 11/1953 | Cook et al................ | 40/310 |
| 3,497,320 | 2/1970 | Blackburn et al. ......... | 23/292 |
| 3,526,708 | 9/1970 | Leatherman................ | 346/74 MP |
| 3,565,582 | 2/1971 | Young .................... | 23/230 |
| 3,597,751 | 8/1971 | Heidecker................. | 340/174.1 H |
| 3,519,988 | 7/1970 | Grossman.................. | 340/174.1 H |

*Primary Examiner*—Vincent P. Canney
*Attorney*—Gerry J. Elman, George W. F. Simmons and Carl A. Castellan

[57] ABSTRACT

A method and apparatus for providing patient record information on a specimen tube containing a specimen taken from the patient and for reading the information therefrom when the analysis of the specimen has taken place. A typewriter is used in conjunction with encoding and writing circuits to cause a magnetic recording head to provide binary information on an annular magnetic band on the specimen tube. When the analysis of the tube contents have taken place, the tube is placed in a rotating reading device and a magnetic reading head picks up the coded information and through decoding circuitry either prints out the information and/or stores it in a computer along with the results of the specimen analysis.

2 Claims, 15 Drawing Figures

PATENTED DEC 11 1973 3,778,790
SHEET 1 OF 8
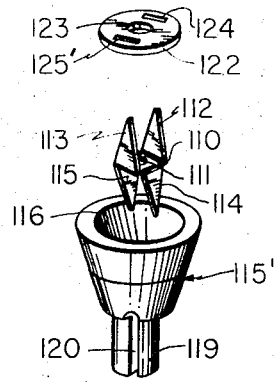
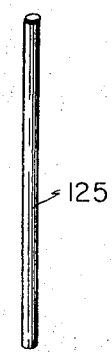
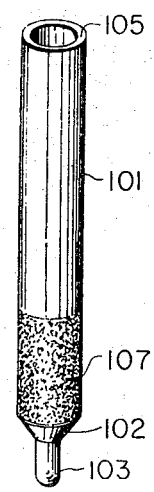
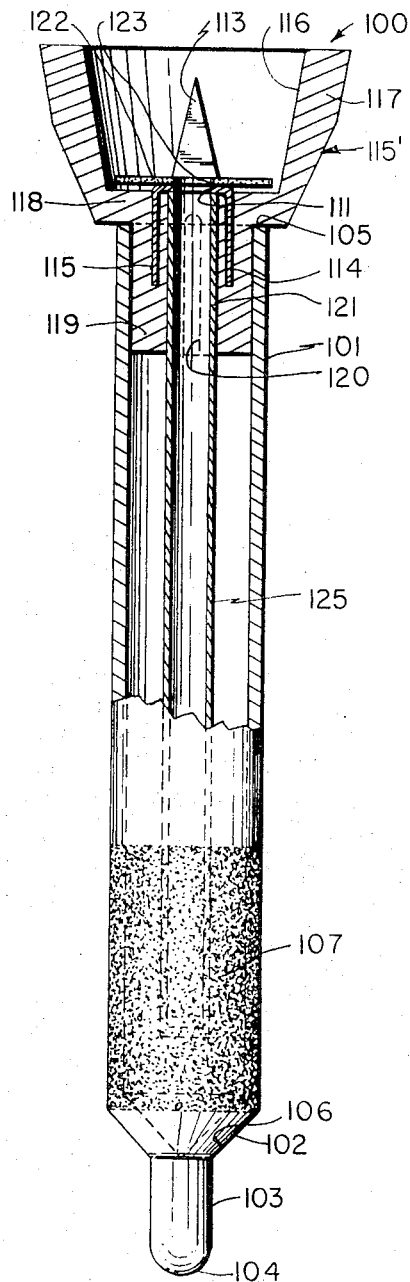
FIG. 2
FIG. 1
INVENTORS
JEAN—LOUIS PROST
MANUEL C. SANZ
BY  *Gerry J Elman*
ATTORNEY

PATENTED DEC 11 1973

INVENTORS
JEAN—LOUIS PROST
MANUEL C. SANZ

BY Gerry J Elman

ATTORNEY

INVENTORS
JEAN—LOUIS PROST
MANUEL C. SANZ

INCREMENTAL RECORDATION ON TEST TUBE

This invention relates to an apparatus and method of inscribing patient data on tubes containing a sample fluid of the patient and later reading said information off said tube after or during analysis of said sample to provide a permanent record of said data together with the analysis results.

One of the problems involved in the automated analysis of blood or urine samples has been the maintenance of the patient information as a record separate from the vial or tube carrying the sample itself. Usually, the patient information is recorded on a numbered card and the tube containing the sample is given a corresponding number. The numbering of the tube usually involves attaching by an adhesive or other suitable means a tag to the external surface of the tube or the stopper in the tube. The disadvantages in this approach are obvious, namely the loss of the tag, label or stopper during the analytical procedures. This approach also necessitates making sure that the information card number corresponds with the number on the tube after the analysis has been conducted to match up patient history with the appropriate diagnosis.

Another approach is to place the patient information in a certain order and to place the tube containing the sample in a test tube rack or tray in the same order. The problems involved with this approach are obvious. If either the patient records or the tubes are not placed or maintained in proper order, the diagnosis will not mate with the proper patient history.

Thus, there has arisen a need for an automated apparatus by which the procedure of recording patient identification data so that the information contained therein is readily available when the analysis of the sample is performed.

With the advent of automated laboratories and the need for large automated diagnostic clinics for the public, it is also important that the procedure of automatically recording and reading patient data be adaptable for integration into these aforementioned concepts where the patient data is automatically fed to an electronic sample analyzer so that the sample analysis results may be weighed and evaluated.

Accordingly, this invention is concerned with magnetically inscribing patient data on the surface of a sample tube. The system is both mechanical and electronic. A typewriter plays a dual role in that it prepares a card written out in clear reproducing the data inscribed on a tube and it generates the electrical data which, after being processed in the following circuits, is written on the tube. There are three kinds of data; there is a signal associated with each key for the identification of the latter; a signal that is common to all of the keys and which controls the forward displacement of a means for driving the tube step by step; and a signal indicating the beginning of each card, enabling all of the writing circuits to be prepared and a start writing signal to be inscribed on the tube.

The coding circuits attribute to each character that is struck on the typewriter keyboard a certain combination of six binary digits ("bits") which enable the character to be identified. These six bits provide $2^6$, i.e., 64, different possible combinations. They are required to identify the 26 letters of the alphabet and the basic 10 figures that can be used, plus possibly a few special signs.

During a reading operation, the parity circuits will enable the characters being read to be each checked and will enable part of the errors which might have occured to be detected. During a writing operation, these circuits act by generating a seventh bit and this bit will be a binary "one" if there is an even number of "ones" in the character or a binary "zero" if there is an odd number of ones in the character.

The start writing signal, which is sent out at the beginning of each new card, enables all of the electronic circuits to be placed in their starting condition and enables a start writing character to be generated which, at the time of reading, will enable synchronization of the operations.

The writing circuits, which are equal in number to the number of magnetic heads, enable current to be supplied to the writing head block. The actual writing is performed by changing over from a flux $\phi$ to a flux $-\phi$ of equal value but of opposite sign, sufficient to saturate the magnetic coating in one direction or the other. The mode of writing used, NRZI (Non Return to Zero Inverted), is such that each one is repesented by a change-over from one state of saturation to the other, whereas a zero brings about no change in relation to the previous bit. The inscription on the support is made when the latter is stationary thereby cutting out the reversal time conditions for the current in the heads, provided it is less than the striking time on the typewriter keyboard. The writing go-ahead signal is given by the tube advancing circuit, to ensure that the tube is stationary during writing.

The step by step rotation of the tube is controlled by the typewriter. An electromagnetic device (a relay or a stepping motor) enables this signal to be converted into a discontinuous rotational movement. The number of steps must of course be greater than the maximum number of characters to be written.

This asynchronous mode of parallel series recording avoids the need for a buffer memory, this being required with synchronous recording.

The tube is then placed in an automatic analyzing machine wherein the sample is tested. This machine may also incorporate the reading apparatus and function of this invention. The reading action is performed in continuous manner, i.e., the tube rotates at a constant, known speed, such rotation being effected by a synchronous motor. The magnetic tape travels past a block of magnetic heads. The latter, because they are sensitive to variations of the remnant flux in the tape, deliver positive or negative voltage pulses depending on the direction of the flux variation. These pulses of low amplitude are amplified linearly up to an amplitude of a few volts. They are then fed to a rectifying stage which delivers positive signals at its output. Each pulse then represents a logical one, and the absence of a pulse at instants determined by a clock represents a logical zero. The pulses, which are of variable shape depending on the writing and reading conditions, are converted into rectangular pulses of fixed amplitude and width by a peak detector which changes over each time the differential coefficient changes sign. This occurs between two pulses and at the peak of each pulse. Since the initial state of the detector is preset, use is made of the change of state corresponding to a pulse peak to trigger off a monostable multivibrator which supplies the desired rectangular pulse. The peak detector is preceded by a threshold circuit, which only lets through pulses having a height greater than an adjustable level, so that low amplitude noises, that are due to the tape as such or to the various circuits, can be blocked off.

When the seven bits that make up each character are regenerated, a parity check is performed, this being a reverse operation to that performed during writing, i.e., the number of binary ones are counted in each character. If this number is odd, nothing happens, and the character is deemed to be correct by the error detector, but in reality, an even number of errors might have been made; if the number is even, an error signal is fed to the checker. In this event, either the reading operation can be repeated until it is done faultlessly — but this might prove to be impossible if the error was made during writing – or the erroneous data is removed and the existence of an error is indicated.

The characters are then fed into a buffer memory, the memory storage operation being started by an order given by a synchronization character inscribed at the beginning of the writing operation.

The clock is regenerated by the characters themselves. Because of the parity check, there must always be at least one "one" per character (odd parity). It is therefore sufficient to feed the seven tracks to one OR gate and to trigger off by means of the first one a monostable multivibrator having a suitably chosen period to produce the clock signal. The monostable multivibrator is essential for it is necessary to take into account a certain amount of dispersion in the time length of the bits making up one character. This clock enables the characters to be separated and to be fed into the buffer memory.

The reading operation ends upon the reappearance of the synchronization character that started it or when all memory positions are filled.

The decoding circuits convert the characters that are fed into the memory into signals that are compatible with a printer or with the central memory of a computer.

Accordingly, it is an object of the present invention to provide an automated process wherein the patient information is inscribed on the side of a sample tube carrying a fluid sample of the patient and later read off the tube to be used in connection with the analytical data from the sample.

It is a further object of this invention to provide an apparatus for magnetically inscribing patient data on a sample tube carrying a fluid sample and for reading said information at a later date.

A further object of this invention is to provide an electronic data encoding system and method for magnetically inscribing patient data on the side of a sample tube.

Another object of this invention is to provide an electronic system and method for reading coded information from a magnetic band on a sample tube.

These and other objects of this invention will become apparent when taken with reference to the accompanying specification and drawings in which:

FIG. 1 is a side view of the tube showing the blood sampling attachment and a portion of the tube shown in section;

FIG. 2 is an exploded perspective view of the tube and the component parts of the blood sampling attachment;

SPECIMEN TUBE 100

Figure 3:
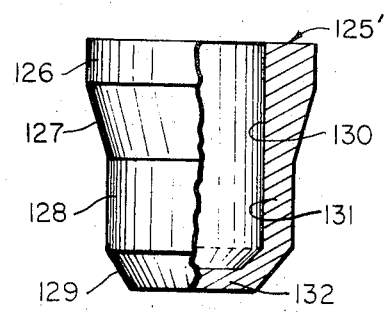
FIG. 3 is a side view, partially shown in section, of the stopper used to seal the sample within the tube.
Figure 4:
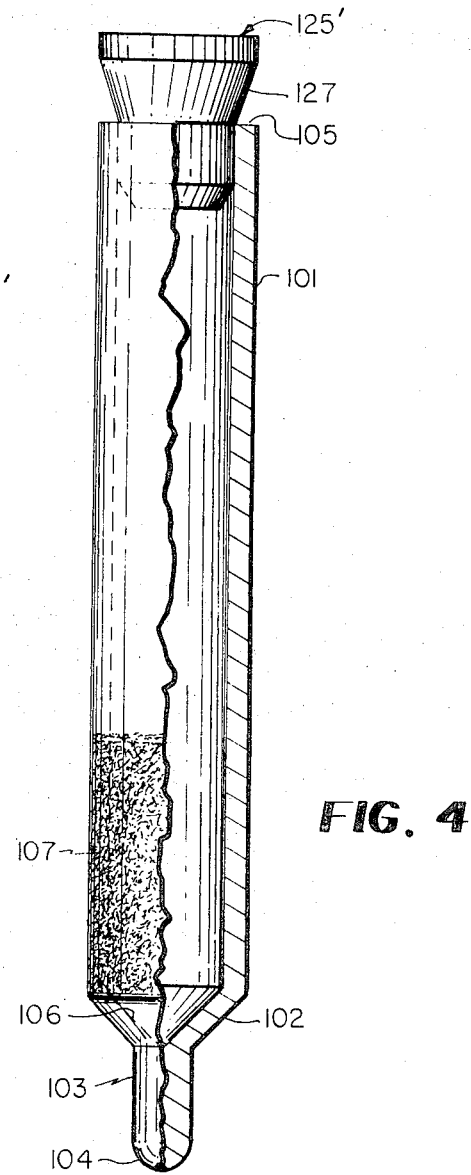
FIG. 4 is a side view of the assembled stopper and tube with part of the tube shown in section.

Referring now to FIG. 1, there is shown the specimen tube designated generally as 100.

It consists of a tubular portion 101 which tapers at the lower end, at 102, into a cylindrical projection 103 with a rounded end portion 104. Portion 103 need not be cylindrical but may be square, triangular or another shape. The internal portion of the tube tapers as at 106 to a point although this is not necessary; it may have a flat or concave bottom.

The top edge 105 of the tube is planar.

The external annular surface of the lower end of the tube has a magnetizable band of material thereon. The magnetic surface 107 may be provided by spray coating, painting or other means of adhesion. In the aternative, a layer of magnetizable material, such as magnetic tape, may be adhesively secured to the tube. On this layer or band of material, information regarding the source of the sample specimen contained within is printed by any of several well-known encoding techniques.

The top of the tube 101 is adapted to receive a blood sampling attachment 115'.

The attachment includes a generally square stainless steel plate 110. Plate 110 has a circular opening 111 in the center thereof for a purpose to be described. On one pair of opposite edges of plate 110 are a pair of triangularly shaped lance members 112 and 113. An identical pair of lance members 114 and 115 are mounted on the remaining opposite edges of plate 110 and depend therefrom in a direction opposite to members 112 and 113.

Attachment member 115' is generally in the shape of an inverted truncated cone with an internal recess 116 therein. The upper annular portion of the member 115' is widened as at 117. A planar portion 118 forms a bottom of member 115'.

Depending from portion 118 is a cylindrical portion 119 which has a centrally located bore 121 therein.

Member 115' is made of a resilient material such as rubber or plastic. Since portion 119 is made with an outside diameter equal to the internal diameter at least one notch 120 is provided on the side of portion 119 and the bottom of bottom portion 118 to enable the portion 101.

A more important reason for notch 120 is to allow air within tube 101 to escape as it is being filled with a sample specimen.

A circular disc member 122 is adapted to receive lance members 112 and 113 through slots 124 and 125 which are of a length equal to the base of members 112 and 113. Disc 122 has a centrally located aperture 123 therein which aligns with aperture 111 in plate 110.

The attachment is assembled by placing the disc 122 onto plate 110 and forcing the plate down into member 115'. For this purpose, a pair of precut slots may be provided in the upper surface of bottom portion 118 for ease of entry of lance members 114 and 115 into the portions 118 and 119.

Apertures 123 and 111 are aligned with bore 121. Received within bore 121 and extending down into tube 101 is a slender tube 125. The top of tube 125 is in engagement with the bottom of plate 110.

The operation of the tube 101 and attachment member 115' is such that the tube, with the attachment, is forced up, either by hand or mechanical means, against a finger or other portion of the body until the portion 117 distends. The lance members 112 and 113 penetrate the skin and the ensuing drops of blood pass into the recess 116, through apertures 111 and 123 and through 125 into the base of tube 101.

Once a sufficient amount of sample blood is in tube 101, the tube is withdrawn and the lance members 112 and 113 are withdrawn from the finger. The attachment 115' together with tube 125 is withdrawn from the tube and a stopper such as 125' is introduced into the top of the tube.

Stopper 125' has an annular flange portion 126, a tapered portion 127, a reduced diameter section 128 which is received with the top of tube 101 and a second tapered area 129. The stopper has a uniform diameter recess 130 therein which allows for the thin wall 131 of section 128 to distend inwardly when the stopper is inserted in tube 101. The bottom of stopper 125' is closed by base portion 132. The stopper provides an air tight seal in tube 101. The stopper is made entirely of a resilient material such as rubber or plastic.

When one desires to analyze the tube contents, the stopper 125' is removed and the projection at the base of the tube is inserted in a chuck or similar gripping device by which the tube is rotated. A magnetic reading head is placed adjacent the surface area 107 and the information regarding the sample is read.

It is understood that when the sample is taken, the tube has information recorded thereon either just before or immediately after the sample is taken.

The projection 103 is preferably integral with the remainder of the tube but may be made of a different material such as metal if the tube is glass or plastic. It is important that the projection be centrally located on the base of tube 101 so that its axis is coaxial with the vertical axis of tube 101. This is necessary so that the distance between the tube sruface and the reading head or recording head remain constant as the tube rotates.

The tube shown is the preferred arrangement for a 350 ul. capacity type.

WRITING APPARATUS 200

Figure 5:
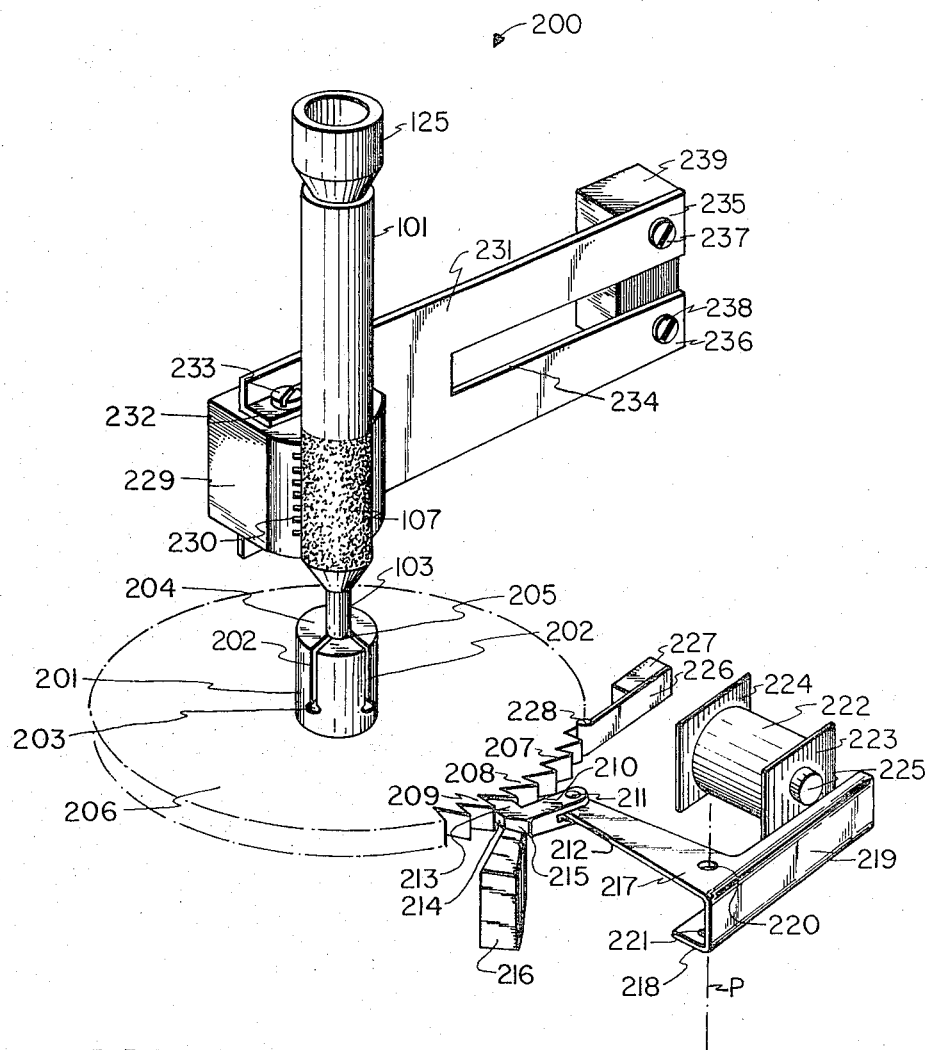
FIG. 5 is a perspective view of the apparatus by which information is recorded on the surface of the tube.

Referring now to FIG. 5, there is shown an apparatus for holding and rotating a specimen tube during the writing of information thereon. The apparatus is designated generally as 200.

The tube 101, with stopper 125' therein, has its projection 103 inserted into a chuck 201. Chuck 201 may be constructed of metal, rubber or plastic. It has a central projection receiving aperture 205 and a flat top surface 204. A series of slots 202 extend across the surface 204 and down the sides thereof and terminate in rounded openings 203. If the chuck is of a resilient plastic, the projection 103 of tube 101 is forced down into aperture 205 spreading the segments of the chuck apart which results in their firmly gripping the tube projection.

Chuck 201 is mounted in a coaxial fashion on a toothed disc 206 for rotation therewith. Disc 206 has a plurality of teeth 207 around the periphery thereof. Each tooth has a short inclined surface 209 and a long inclined surface 208.

The teeth cooperate with a mating projection 213 of an advancing ratchet pawl 210. The pawl projection 213 has a bearing surface 214 which engages surface 209 of the teeth 207.

Pawl 210 is pivotally attached to lever 217. A pin 211 passes through forked sections of ratchet pawl 210 and the end of lever 217 which is received in slot 212 of pawl 210.

Ratchet pawl 210 has another bearing surface 215 which cooperates with a locking block 216 which forces it into engagement with teeth 207 on disc 206.

Lever 217 has a main portion 219 which is channel-shaped having flanges such as 218 with holes 220 and 221 therein. Lever 217 is adapted to pivot about a pin P received through holes 220 and 221. The end of main portion 219 is located adjacent a magnet 225 located in a solenoid 222 which is held in place by supports 223 and 224.

To advance the tube, the magnet 225 is activated thus pulling the end of section 219 (which is constructed of magnetic metal) towards it. The lever 217 pivots and pawl 210 forces an incremental rotation of disc 206 until it engages block 216. Upon deactivation of magnet 225, a spring (not shown) forces lever 217 to pivot back to its original position and pawl 210 engages in the adjacent tooth.

To prevent reverse rotation of disc 206, a spring blade 226 with a tooth-engaging projection 228 is mounted by a block 227 adjacent the disc 206. The projection 228 prevents the disc from counter-rotating by engaging surface 209 of teeth 207. When the pawl 210 advances the disc, the inclined surface 208 of each tooth merely forces the spring blade 226 outwardly.

Mounted adjacent the magnetizable area 107 on tube 101 is a multi-track magnetic inscribing head 229. The head forms no part of this invention and any one of several conventional recording heads which are commercially available may be used. The head has a series of vertically spaced recording tracks 230 for magnetizing small areas of area 107 as tube 101 is rotated.

Head 229 is held between bracket extensions such as 232 of a head fixing arm 231. Arm 231 is slightly resilient so as to maintain head 229 in contact with area 107.

Screws such as 233 maintain the head on the bracket extensions.

The arm 231 is split as at 234 to form two attachment portions 235 and 236, which are respectively secured to a mounting block 239 by screws 237 and 238.

Figure 6:
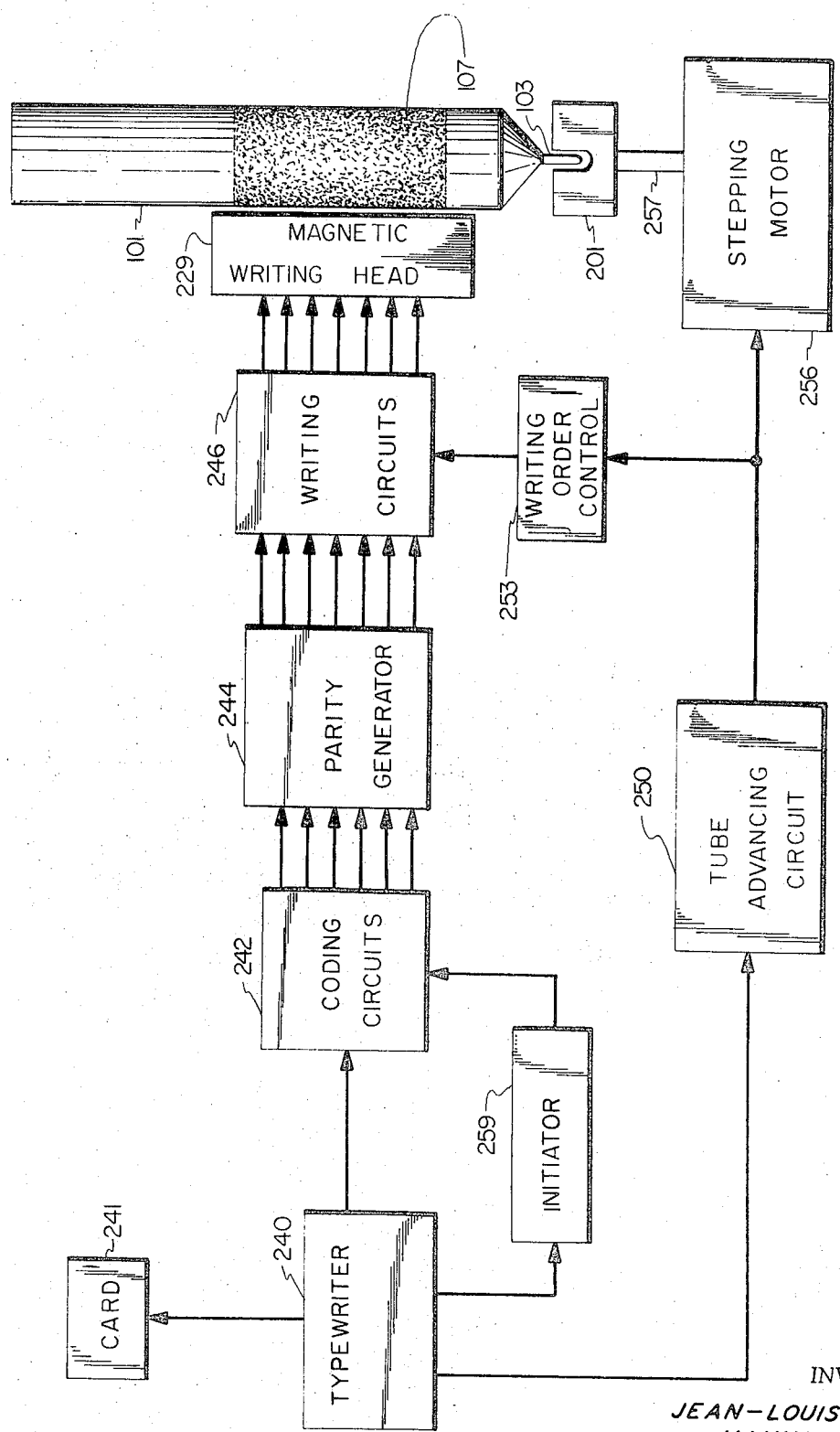
FIG. 6 is a block diagrammatic view of the writing circuitry.

The information to be inscribed on area 107 of tube 101 is transferred to the head 229 by means of a data input member and accompanying circuitry. Such an arrangment is shown in block diagram form in FIG. 6.

The necessary information is transferred into the recording system by means of a typewriter 240. The typewriter prepares a card 241 on which is written out all the data that is inscribed on the tube 101. The typewriter 240 also generates electrical data to be processed by circuitry. This data includes (1) a signal associated with each key for the identification of the latter, (2) a signal that is common to all of the keys and which controls the forward displacement of the means for driving the tube step-by-step, and (3) a signal indicating the beginning of each card, whcih enables all of the writing circuits to be prepared and a start writing signal to be inscribed on the tube.

The coding circuits 242 receive the information from typewriter 240 and attribute to each character that is struck on the typewriter keyboard a certain combination of six binary digits or bits which enable the character to be identified. With these six bits, there are 64 different possible combinations, i.e., two to the sixth power. The two is the binary code, either zero or one. All of the 26 letters of the alphabet, the numbers 0–9 and other special characters can then be represented by these six bits.

The coding circuits 242 begin operating when they receive an initiation signal from start circuit 259. This start-writing signal, which is sent out at the beginning of a new card, enables all of the electronic circuits to be placed in their starting condition and enables a start-writing character to be generated which, at the time of reading, will enable synchronization of the operations. After the characters have been converted to binary code, the latter signals are transferred to a parity generator 244 which acts to generate a seventh bit and this bit will be a binary one if there is an even number of ones in the character or a binary "zero" if there is an odd number of ones in the character. This enables parity circuits during the reading operation to detect errors made in inscribing the tube.

The signals pass from the parity generator to writing circuits 246. Each recording head will have its own writing circuit. The writing circuits provide current to the writing head. The actual writing is performed by changing over from a flux $\phi$ to a flux $-\phi$ of equal value but of opposite sign. This change is sufficient to saturate the magnetic coating 107 in one direction or the other. The mode of writing used, non return to zero inverted, is such that each one is represented by a change-over from one state of saturation to the other, whereas a zero brings about no change in relation to the previous bit. The inscription on the area 107 is made when it is stationary thereby cutting out the reversal time conditions for the current in the heads, provided it is less than the striking time on the typewriter keyboard. The writing go-ahead signal is given by the tube-advancing circuit 253 to insure that the tube 101 is stationary during writing.

The step-by-step rotation of tube 101 is controlled by the typewriter 240 through circuit 250. An electromagnetic device, such as stepping motor 256, enables this signal to be converted into a discontinuous rotational movement through shaft 257 to chuck 201. The number of steps naturally are greater than the maximum number of characters to be written.

Since the method of writing just described is an asynchronous mode of parallel series recording, it avoids the requirement for a buffer memory which is needed in a synchronous recording method.

Figure 7:
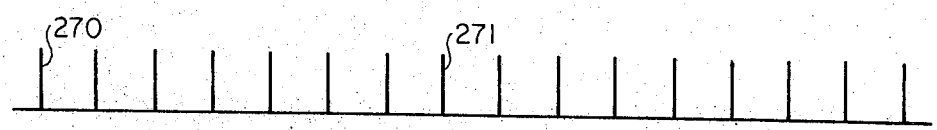
FIG. 7 is a graph showing the clock pulses plotted versus time.
Figure 8:
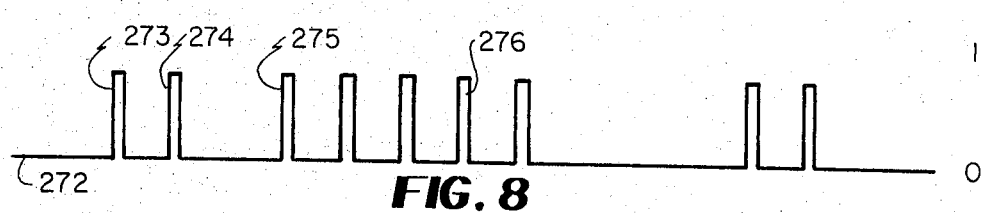
FIG. 8 is a graph showing the positive binary pulses plotted versus time.
Figure 9:
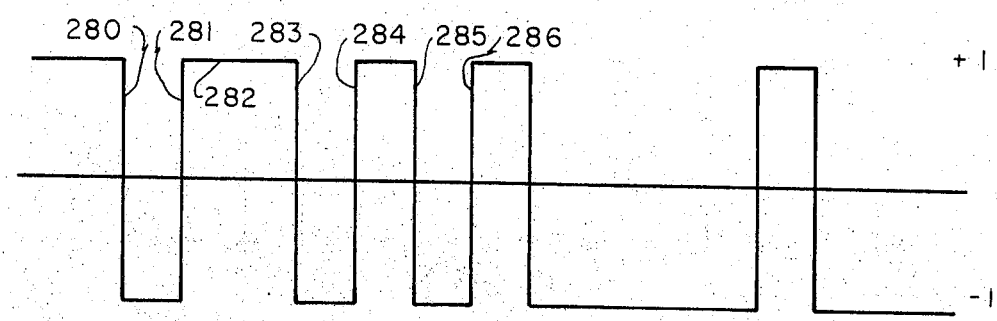
FIG. 9 is a graph showing the change in flux in the writing circuit plotted versus time, a vertical line passing through FIGS. 7-9 representing the same increment of time in the three plots.

FIGS. 7–9 show the form of the signals as they are converted by the coding and writing circuits. FIG. 7 shows the clock pulses with a pulse such as 270, 271, given for each predetermined increment of time. FIG. 8 shows the bits of information provided by the coding circuits with one bits 273, 274 and 275–276 provided in the time from clock pulse 270 to clock pulse 271. Only one zero bit at level 272 occurs in this period.

FIG. 9 shows the current emanating from the writing circuits. Since there were two ones in the coded signal, followed by a zero and then four more ones, there are two flux changes 280 and 281, followed by no change, 282, and followed by four more flux changes 283–286 to represent the ones.

At this stage, the sealed tube is ready to be analyzed since all the information necessary to identify the sample is on the coating 107. The tube can be run through an automatic analyzer together with a group of other sample tubes. The analysis is done by an automated technique employing a computer to store the results of the analysis. As the tube proceeds through the process, it is given a number.

READING APPARATUS 300

Figure 10:
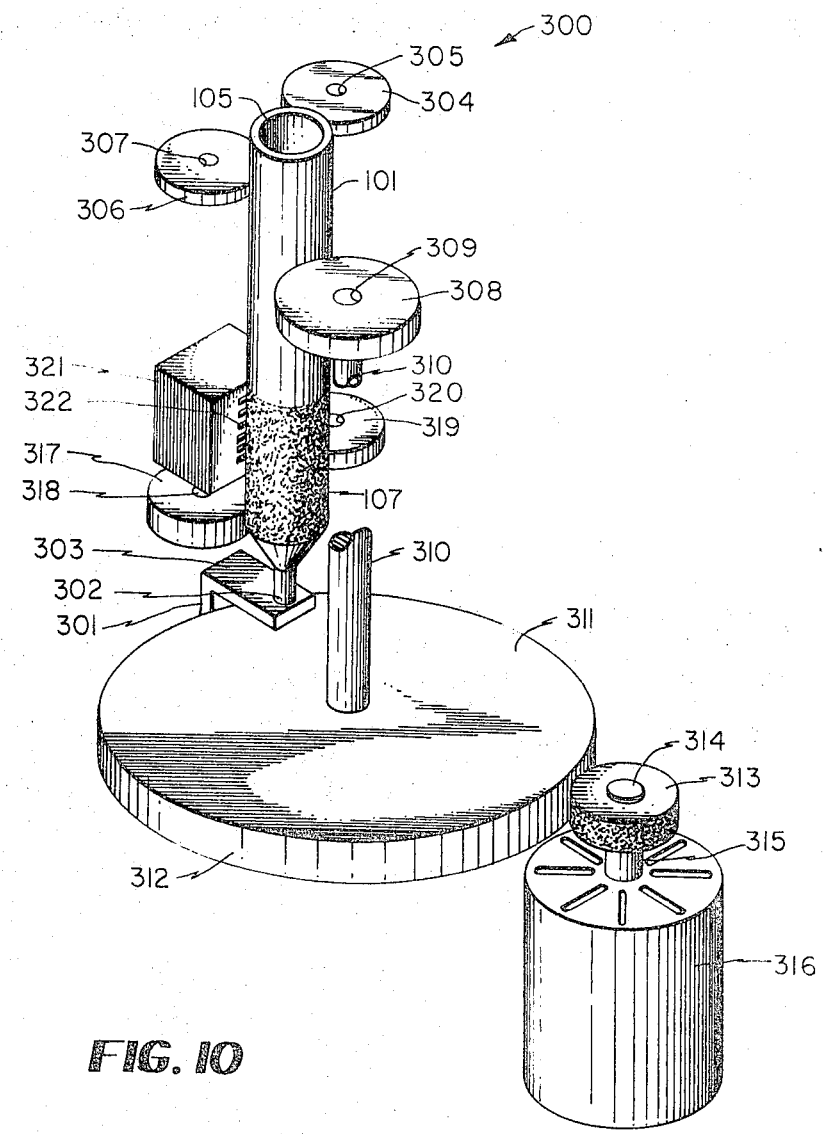
FIG. 10 is a perspective view of the apparatus by which information is read off the surface of the tube.

When the tube contents are analyzed, the computer gives the tube a number. After the analysis, or simultaneously therewith, the tube is placed in a constant speed reading apparatus designated generally as 300 in FIG. 10.

The projection of the tube rests on the surface 303 of a horizontally extending flange 302 of a support bracket 301. A pair of support rollers 304,306 of a soft material such as rubber or foamed plastic have bores 305,307 therein, respectively, for receiving a pair of shafts (not shown).

A driving wheel 308 has a bore 309 therein for receiving a shaft 310 and being driven thereby. The wheel 308 is preferably of a high friction material which will rotate tube 101.

Shaft 310 is secured in a coaxial manner to flywheel 311 which has an annular peripheral surface 312. A driving roller 313 is in engagement with surface 312. Roller 313 has a bore 214 which receives the driving shaft 315 of a synchronous motor 316. An alternate method of driving flywheel 311 would be to provide a groove in surface 312 and use a pulley and belt in lieu of the friction drive of roller 313.

A second pair of support rollers 317 and 319 are mounted so as to rotate on the same shafts as rollers 304 and 306. The shafts (not shown) would be received in bores 318 and 320.

Thus, the tube is supported vertically by surface 303 and laterally by free wheeling rollers 304, 306, 317 and 319 and driving roller 308.

A magnetic pick-up head 321 is positioned (in any suitable manner) adjacent coating 107 on tube 101.

The head has a plurality of pick-up tracks such as 322. It does not contact the coated surface 107 and thereby avoids wear in the head. The head itself forms no part of this invention and any one of a number of commercially available pick-up heads may be used.

Figure 11:
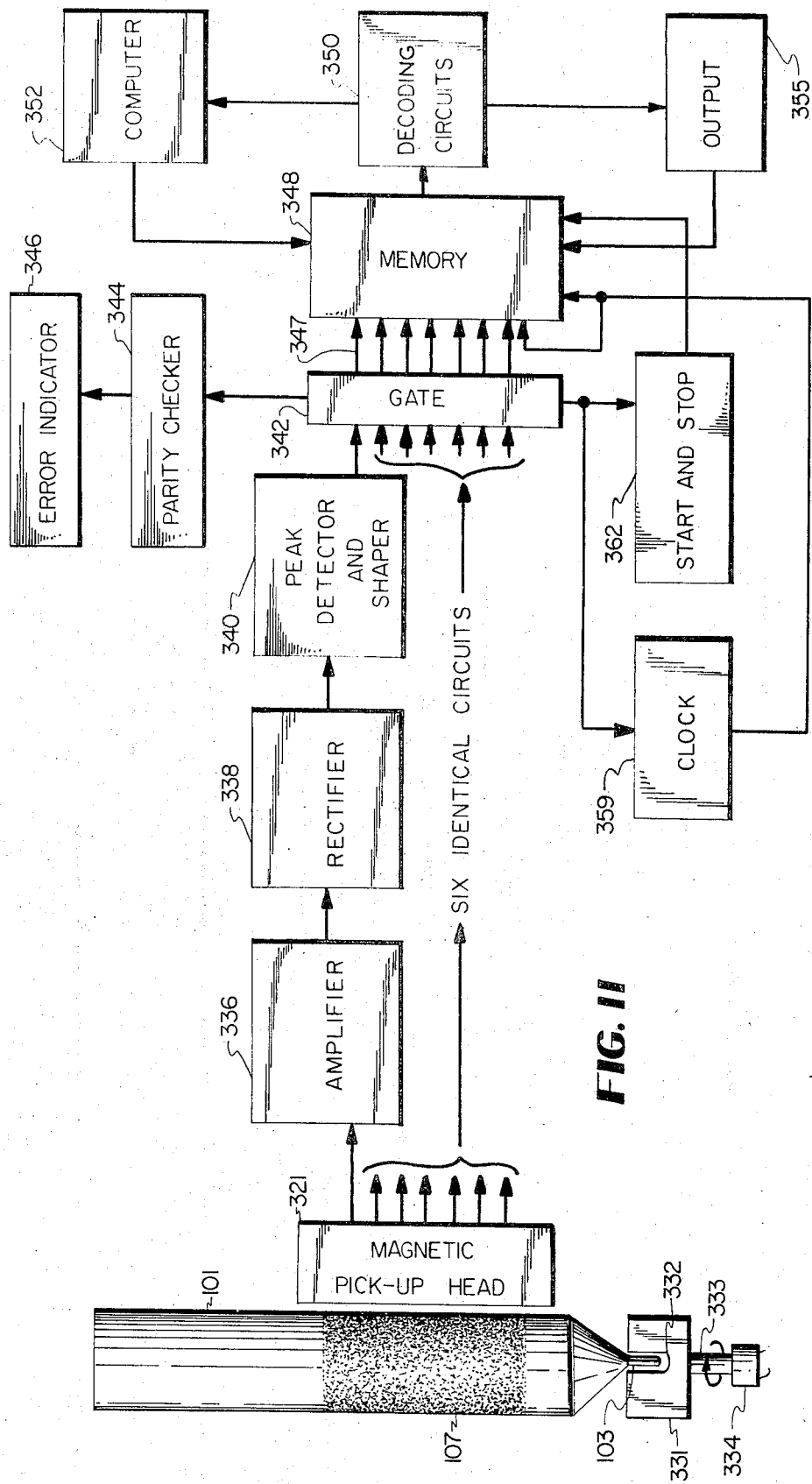
FIG. 11 is a block diagram view of the reading circuitry.

Referring now to FIG. 11, there is shown the circuitry, in block diagram form, for handling the information received from the pick-up head. The reading device, hereinafter described, enables this data to be restored either in legible form on a printer or in the form of binary combinations than can be assimilated by a computer memory. The reading is performed in a continuous manner, i.e., the tube 101 rotates at a constant, known speed, the rotation being provided by either the arrangement described in FIG. 10 or, as shown in FIG. 11, a synchronous motor 334 driving shaft 333 on which is mounted chuck 331. Chuck 331 has a bore 332 which receives projection 103 of tube 101.

The tube, with its band of magnetizable material 107, rotates relative to magnetic head 321. Head 321, because it is sensitive to variations of the remanent flux on the surface 107, delivers positive or negative voltage pulses depending on the direction of flux variations.

Figure 12:
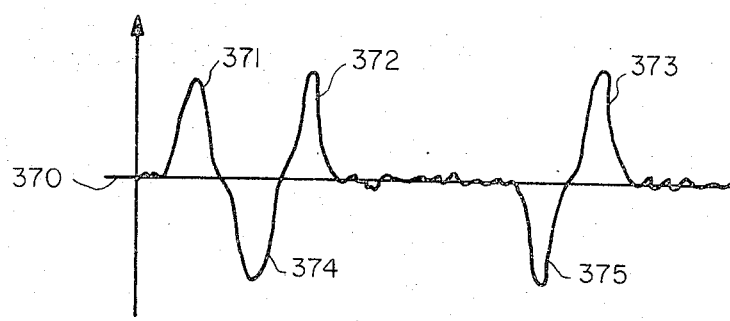
FIG. 12 is a graph showing the pulses received from the magnetic reading head plotted versus time.
Figure 13:
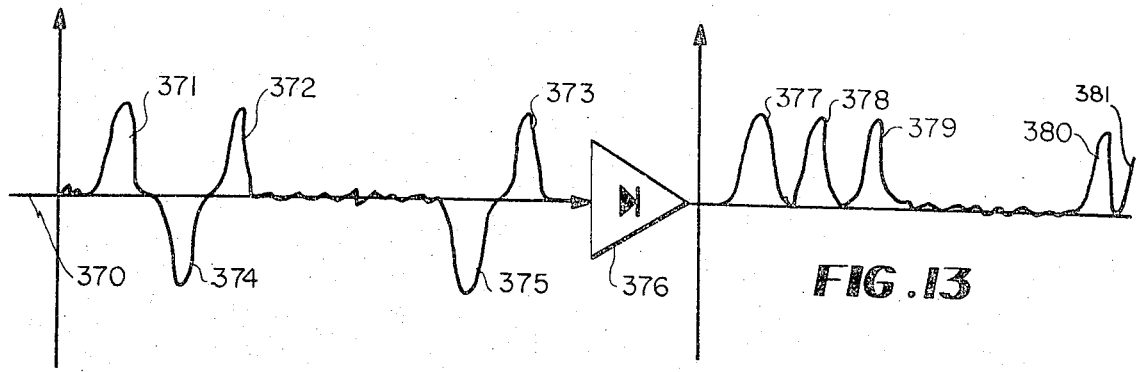
FIG. 13 shows the pulses of FIG. 12 and their shape after being rectified.

These pulses are of low amplitude, a few millivolts, and are shown in FIGS. 12 and 13. The plus pulses are shown as 371, 372, and 373 and the minus pulses are shown as 374 and 375 on axis 370. The pulses are amplified by amplifier 336 to an amplitude of a few volts. The pulses are then fed to a rectifier 338 (FIG. 11) which contains an integrated circuit 376 (FIG. 13) which delivers positive signals such as 377 through 380 (FIG. 13) at its output. Each of said pulses then represents a logical one and the absence of a pulse, such as between 379 and 380, as determined by a clock 359, represents a logical zero.

Figure 14:
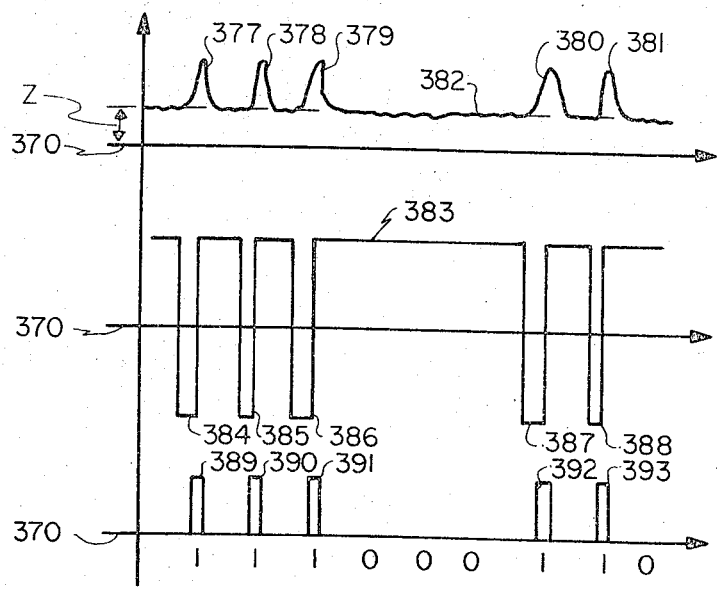
FIG. 14 shows the plot of the pulses received by the recording apparatus at the threshold level, peak detection and monostable phases.

The pulses are fed through a threshold circuit which only lets through pulses having a height greater than an adjustable level Z (as shown in FIG. 14). This results in pulses 377–381 being "clipped" so as to project above a chosen Z level, such as 382 in FIG. 14.

Pulses 377–381 are of variable shape depending on the writing and reading conditions. They are converted into rectangular pulses of fixed amplitude and width, such as 389–393 in FIG. 14, by a peak detector and shaper 340 (FIG. 11), which changes over each time the differential coefficient changes sign. This occurs between two pulses and at the peak of a pulse. Since the initial state of the detector 340 is preset, use is made of the change of state corresponding to a pulse peak to trigger off a monostable vibrator which supplies the desired rectangular pulses such as 389 through 393 in FIG. 14.

When the seven bits that constitute each character are regenerated (such as shown between 389 and 393 in FIG. 14) a parity checker 344 operates to check the number of binary ones in each character. This is a reverse procedure to the operation performed during the writing process. If the number of binary ones is odd, nothing happens, and the character is deemed to be correct by the error detector 346. If the number is even, an error signal is fed to checker 344. In such a case, the reading operation can be repeated until it is done faultlessly. Since an error in the writing would cause this checking to go on endlessly, a provision can be made in the circuit to only allow one or two repeats to the reading procedure.

Figure 15:
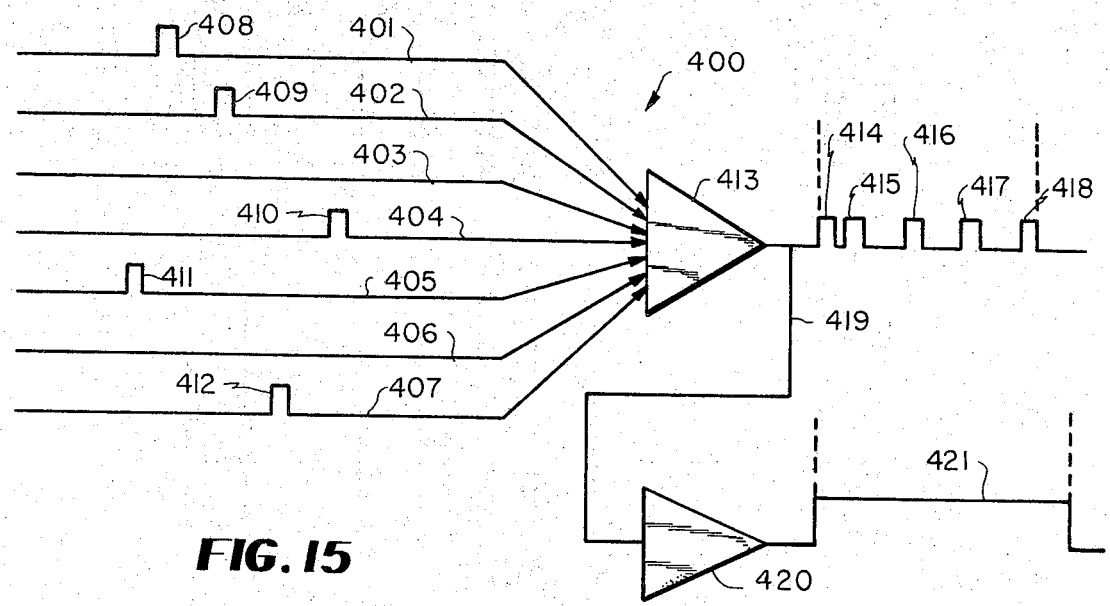
FIG. 15 shows a combined plot and block diagram as the seven tracks are fed to one OR gate and the corresponding clock pulse.

Referring now to FIG. 15, the seven tracks 401–407 are fed to an OR gate 342. Each track 401–407 contains a pulse 408–412, respectively. This is satisfactory to set off the clock 359 (FIG. 11) containing a monostable multivibrator 420 since, because of the parity check, there must always be at least one "one" per character (odd parity). I.e., the clock is regenerated by the characters themselves. The first one triggers off the monostable multivibrator 420 which has a suitably chosen period in which to produce the clock signal 421 (FIG. 15).

The multivibrator is essential for it is necessary to take into account a certain amount of dispersion in the length of the bits making up one character. The clock 359 enables the characters to be separated and then fed into a buffer memory 348. The memory storage operation is initiated by an order given by a synchronization character inscribed at the beginning of the writing operation which triggers start and stop circuit 362. The reading operation ends upon the reappearance of the same synchronization character that started it or when all the memory positions in buffer memory 348 are filled.

The memory 348 then transfers its signals to a decoding circuit 350 that converts the characters into signals that are compatible with a printer output 355 or with the central memory of a computer 352.

While only one embodiment of the invention has been shown and described, it will be apparent to those skilled in the art that many changes and modifications may be made without departing from the scope of the appended claims.

What is claimed is:

1. An apparatus for providing patient data on a sample tube having a magnetic band therearound and carrying a patient specimen therein, said apparatus comprising means to encode said data into binary form, a magnetic recording means, means to convert said binary data into plus and minus signals and motor means to rotate said tube adjacent said magnetic recording means to cause said recording means to provide pluse and minus flux variations in said magnetic band in response to said plus and minus signals, said tube-rotation means including a tube-advance circuit means, a rotary chuck means having teeth around its periphery and adapted to support said tube, a ratchet and pawl means having a solenoid associated therewith for activating said pawl to engage a tooth on said rotary chuck and to advance said chuck by a predetermined amount, said solenoid being adapted to be energized by said tube-advance circuit means each time a character is printed on said tube band.

2. An apparatus for providing patient data on a sample tube having a magnetic band therearound and carrying a patient specimen therein, said apparatus comprising a rotatable support for holding the tube, magnetic recording means adjacent the magnetic band when the tube is mounted in the support, ratchet means for intermittently rotating the support, a solenoid associated with the ratchet means to rotate the support a predetermined amount when energized, and means to energize the solenoid each time a character is printed on the magnetic band by the magnetic recording means.

\* \* \* \* \*